United States Patent

Stoddard

[11] Patent Number: 6,110,525
[45] Date of Patent: Aug. 29, 2000

[54] COATING COMPOSITION FOR PROTECTING SURFACES AND METHOD OF USING SAME

[75] Inventor: LeRoy B. Stoddard, Commerce Township, Mich.

[73] Assignee: Pro-Sol, Inc., Birmingham, Mich.

[21] Appl. No.: 09/151,486

[22] Filed: Sep. 11, 1998

Related U.S. Application Data

[60] Provisional application No. 60/058,777, Sep. 12, 1997.

[51] Int. Cl.[7] .............................. B05D 1/38; B05D 3/00; C08L 9/00; C08L 19/00
[52] U.S. Cl. ......................... 427/154; 252/383; 252/384; 523/334; 427/195; 427/202; 427/156
[58] Field of Search ..................................... 427/154–156, 427/180, 189, 195, 202; 523/334; 526/388, 386, 932, 938; 252/381, 383, 384

[56] References Cited

U.S. PATENT DOCUMENTS

| | | | |
|---|---|---|---|
| 2,961,348 | 11/1960 | Finnegan et al. . | |
| 3,256,234 | 6/1966 | Miller . | |
| 3,422,050 | 1/1969 | Brown et al. . | |
| 3,997,302 | 12/1976 | Supkis | 51/295 |
| 4,082,830 | 4/1978 | Cogliano | 427/154 |
| 5,143,949 | 9/1992 | Grogan et al. | 427/154 |
| 5,492,741 | 2/1996 | Akao et al. | 428/35.2 |
| 5,567,756 | 10/1996 | Swidler | 427/156 |
| 5,658,971 | 8/1997 | Allin et al. | 524/28 |

*Primary Examiner*—Diana Dudash
*Attorney, Agent, or Firm*—Lynn E. Cargill; Susan M. Cornwall

[57] ABSTRACT

A coating composition which forms a peelable coating for protecting surfaces of an object from the outside elements. The coating composition includes a latex of rubber particles and a UV absorber, wherein the rubber particles are present from about 35 to about 50 weight percent in the coating composition. The coating composition may also include from about 0.5 to about 4 weight percent of an antioxidant; from about 0.003 to about 0.03 weight percent of a biocide; from about 0.03 to about 0.08 weight percent of a defoamer; from about 0.07 to about 0.40 weight percent of a thixotropic agent; and a rust inhibitor, wherein all weight percents are based on the total weight of the coating composition. The method of using the composition includes coating the surface with a layer of the above-described coating composition and allowing the layer of coating composition to dry and form a coating which is capable of being peeled from the object.

15 Claims, No Drawings

COATING COMPOSITION FOR PROTECTING SURFACES AND METHOD OF USING SAME

This application claims benefit of provisional application Ser. No. 60/058,777 filed Sep. 12, 1997.

TECHNOLOGICAL FIELD

The present invention relates generally to coating compositions and methods for using same and, more particularly, to coating compositions which form peelable protective coatings and methods for using same.

BACKGROUND OF THE INVENTION

Overseas shipment by boat of American vehicles or other large painted or surface-finished products causes problems with the perfect integrity of the finished surfaces due to the lengthy exposure of the products to the outside elements, such as wind, rain, and sun. Additionally, domestic truck shipping of exposed vehicles and other products experience problems due to stone chips, bird droppings, pollution, and other contaminants, as well as the usual outside elements. Consequently, it would be advantageous to the industry to have available a protective coating for finished surfaces usable during transit. Ideally, the coating should be cost-effective, easy to apply, and easy to remove.

Another need for a protective coating is for protecting objects, such as metallic objects, which are susceptible to damage from moisture. Currently in the automotive industry, many parts are formed by casting them or molding them in large steel dies which have been precision made to make parts which meet certain specifications. Due to the large size of the dies and the usual shortage of warehouse space, the dies are typically stored outside and are exposed to rain and the other elements. Eventually, the dies rust and either need to be cleaned, refinished, or scrapped. There is, therefore, a tremendous need for a way of protecting the steel dies from moisture and rain. One way to achieve this protection is by providing a moisture-proof coating for the dies which is easily removed when desired.

Therefore, the present invention seeks to provide an easy-to-apply and cost-effective coating composition which, when applied to a surface, forms a protective coating that does not harm the surface and is easy to remove. The present invention also seeks to provide a method for using the coating composition to protect surfaces, especially finished surfaces.

SUMMARY OF THE INVENTION

To achieve the foregoing objects, one embodiment of the present invention is a coating composition which forms a peelable coating for protecting surfaces of an object from the outside elements. The coating composition includes a latex of rubber particles and a UV absorber, wherein the rubber particles are present from about 35 to about 50 weight percent in the coating composition. The rubber particles may be formed of, e.g., butadiene homopolymers and copolymers, such as styrene butadiene copolymer. The UV absorber is generally employed in the coating composition in an amount of from about 0.25 to about 1 weight percent.

The coating composition may also include from about 0.5 to about 4 weight percent of an antioxidant; from about 0.003 to about 0.03 weight percent of a biocide; from about 0.03 to about 0.08 weight percent of a defoamer; and from about 0.07 to about 0.40 weight percent of a thixotropic agent, wherein all weight percents are based on the total weight of the coating composition.

Another embodiment of the present invention is a method of protecting a surface of an object from damage from exposure to the outside elements. The method includes coating the surface with a layer of the above-described coating composition and allowing the layer of coating composition to dry and form a coating which is capable of being peeled from the object. Preferably, the coating composition is coated to a thickness which results in a dried coating having a thickness of from about 8 to about 15 mils.

Other objects, features, and advantages of the present invention will be readily appreciated as the same becomes better understood after reading the subsequent description.

DESCRIPTION OF THE PREFERRED EMBODIMENT(S)

One embodiment of the present invention is a coating composition for protecting a surface of an object. Surfaces which are particularly in need of protection are those that are capable of rusting, degrading, or being scratched, dented, faded, damaged by contaminants, or otherwise similarly damaged. Examples of suitable surfaces include polished surfaces, cured painted surfaces, and metallic surfaces. The coating composition of the present invention is desirably non-reactive with the accepting surface and which, upon drying, forms a coating which is removable from the surface by peeling. The coating composition is especially useful for protecting objects during exposed transportation of the objects, such as oversees shipment by boat or domestic truck shipping.

The coating composition of the present invention contains a latex of rubber particles. The preferred properties of the rubber particles are such that a dried coating of the latex is capable of being peeled from a surface, has an adequate level of flexibility resulting in a low level of cracking during removal, and has a high enough strength to maintain integrity during peeling, i.e. does not tear easily.

Of the rubber particle latex, the rubber particles themselves are considered the "essential ingredient" and the water and other ingredients in the emulsion, such as emulsifiers, are considered "non-essential ingredients" in the coating composition. The rubber particles are preferably present in the coating composition in an amount of from about 35 to about 50 weight percent.

Preferred types of rubber to be used for forming the rubber particles are polymers formed of conjugated diene monomers, e.g., butadiene and its homologues. The polymers may be homopolymers or copolymers. For example, butadiene monomer and/or its homologues may be copolymerized with a monoolefinic monomer, such as, acrylonitrile, styrene, methyl methacrylate, and combinations thereof. The manufacture of these polymers and their emulsions are disclosed in U.S. Pat. Nos. 2,961,348; 3,256,234; and 3,422,050, which patents are incorporated herein by reference.

An especially preferred type of rubber for the present invention is a styrene butadiene rubber, wherein the butadiene is preferably present in an amount of from about 25 to about 40 weight percent, more preferably, from about 30 to about 35 weight percent. A commercially-available latex of carboxylated styrene butadiene copolymer particles useful for the present invention is sold as "TYLAC" 97422, available from Reichold Chemical Company, Research Triangle Park, N.C. The carboxylation of the copolymer is made by reaction with an unsaturated carboxylic acid such as maleic acid or methacrylic acid, which is also disclosed in the incorporated patents. The non-volatile components in "TYLAC" 97422 are reportably from about 49.5 to about 50.5 weight percent.

Another suitable type of rubber useful for forming the rubber particles is vinyl acetate ethylene copolymer. A commercially-available emulsion of vinyl acetate ethylene copolymer is "ELVACE" 40707, also available from the Reichold Chemical Company.

Other ingredients which are useful in the coating composition of the present invention include stabilizers, such as UV absorbers, antioxidants, and pH stabilizers, waxes, biocides, defoamers, thixotropic agents, and levelling agents. When the coating composition is to be used for protecting metals which are susceptible to rusting, the coating composition may also include a rust inhibitor.

UV absorbers are employed in the coating composition to inhibit degradation of the coating formed from the coating composition and degradation of the underlying surface (e.g., paint) due to exposure to ultraviolet light. Preferably, the UV absorber is compatible with water-based compositions. Emulsified UV absorbers are one type of suitable UV absorber source. It is preferred that a UV absorber be present in the coating composition in an amount from about 0.25 to about 1 weight percent essential ingredient.

One suitable UV absorber is an oxazoline/chlorobenzotriazole derivative, which is available in an aqueous suspension named "SANDUVOR" 3225 from Clariant Corporation, Charlotte, N.C. "SANDUVOR" 3225 is about 26 weight percent of the essential ingredient, the oxazoline/chlorobenzotriazole derivative.

Antioxidants are employed in the present coating composition to inhibit oxidation degradation of the coating formed from the coating composition. One example of a suitable antioxidant mixture is the combination of isobutylene and the reaction product of 4-methyl phenol with dicyclopentadiene. Another suitable antioxidant mixture is the combination of the diester of 3-(dodecylthio)propionic acid and tetraethylene glycol. These mixtures may be used in emulsion form and are typically about 60 weight percent essential ingredient. Preferably, the antioxidant essential ingredient is employed in the coating composition in an amount of from about 0.5 to about 4 weight percent.

An example of a pH stabilizer useful in the coating composition is ammonium hydroxide which is also useful for slightly increasing the pH of the composition. It is preferred to use a pH stabilizer, such as ammonium hydroxide, which evaporates from the coating during drying and leaves minimal residue in the resultant coating. Preferably, the pH stabilizer is employed in the coating composition in an amount of from about 0.1 to about 0.5 weight percent essential ingredient. With or without a pH stabilizer, the pH of the coating composition is preferably from about 8.5 to about 10.

A wax may be included in the coating composition to increase the releasability of the coating formed from the coating composition from a surface. Exemplary wax products useful for the present invention include emulsions of polyethylene wax, polypropylene wax, microcrystalline wax, paraffin wax, and mixtures thereof. Typically, wax emulsions contain from about 25 to about 45 weight percent wax. Preferably, the wax itself is employed in the coating composition in an amount of from about 0.5 to about 4 weight percent.

A biocide may be used in the coating composition to inhibit bacterial growth in the composition. An exemplary biocide is 1,2-dibromo-2,4-dicyanobutane (DBDCB), available in a 25 weight percent solution sold as "TEKTAMER" 38 from the Calgon Corporation, Pittsburgh, Pa. It is preferred that a biocide be used in the composition in an amount of from about 0.003 to about 0.03 weight percent essential ingredient.

An exemplary defoamer useful for the present invention is "DREWPLUS" L108 which contains mineral oil, emulsifiers, and silica derivatives, and is available from Ashland Chemical Company, Columbus, Ohio. "DREWPLUS" L108 is considered to be practically 100% essential ingredient. Typically, a defoamer is employed in the composition in an amount of from about 0.03 to about 0.08 weight percent essential ingredient.

A thixotropic agent may be used in the coating composition to control the viscosity of the composition. When the viscosity of the composition needs to be increased, more thixotropic agent may be added. For spraying applications, a desirable viscosity is from about 7000 to about 13,000 centipoise measured using a Brookfield RVT viscometer spindle #5 at 20 rpm. An exemplary thixotropic agent useful for sprayable coating compositions is found in "UCAR POLYPHOBE" 107, an acrylic latex (about 25 weight percent essential ingredient), available from Union Carbide Corporation, Cary, N.C. An exemplary thixotropic agent useful for brushable coating compositions is found in "RHEOLATE" 420, an acrylic latex (about 30 weight percent essential ingredient), available from Rheox Incorporated, Lightstown, N.J. A thixotropic agent is typically employed in the coating composition an amount of from about 0.07 to about 0.40 weight percent essential ingredient.

A levelling agent may be included in the coating composition to provide the coating with a smoother surface. Exemplary levelling agents useful in the present invention include (a) ionic solutions of acrylic copolymers and (b) combinations of two or more surface active, low molecular weight polymers. Desirably, a levelling agent is employed in the coating composition in an amount of from about 0.1 to about 3.0 weight percent essential ingredient.

Considering all the ingredients discussed above, the coating composition of the present invention may generally have a solids content of from about 35 to about 70 weight percent.

To make the coating composition of the present invention, the ingredients discussed hereinabove are mixed together in a vessel equipped with an adequate mixing device. The mixing device should have an adjustable speed so that the step of mixing the thixotropic agent can be performed appropriately so as to prevent the formation of lumps.

To use the coating composition of the present invention, one merely needs to coat a surface of an object, such as the painted surface of an automobile, with a layer of the coating composition and to allow the layer of coating composition to dry and form a coating which is capable of being peeled from the object. The entire object or only part of the object may be coated, as desired. For example, in coating an automobile, it is advantageous to cover the windows and grill and any other complex surface with paper or plastic before coating the automobile with the coating composition. This helps to ensure that the coating is easy to remove. The coating operation may be done by any of many conventional techniques, such as by spraying, rolling, or brushing.

Advantageously, the coating composition is applied to the object in a thickness which, when dry, will easily peel away from the finished surface. Typically, the coating composition is applied in a thickness which will result in a dried coating having a thickness of from about 8 to about 15 mils. Once the coating composition has been applied, it is preferably dried, and the object then shipped to its final destination where the coating may then be peeled from the object.

The coating is especially advantageous when coated on automobiles or other objects which are to be shipped overseas. Without the coating, fading of the paint or other surface finish on the automobile or object from intensive exposure to the sun is possible. However, if the automobile or object is coated with a coating which incorporates a UV light absorber according to the present invention, the automobile or object will experience considerably less fading.

The industrial applicability of the present invention is for coating objects (finished or unfinished), such as, automobiles, boats, or steel dies to protect the objects from the outside elements. The coating composition and method are especially suitable for protecting new automobiles from scratching during transit.

The following example is illustrative only and should not be construed as limiting the invention which is properly delineated in the appended claims.

EXAMPLE

The following ingredients (in the following order) were added to and mixed in a tank equipped with a mixer using a marine-type propeller: 86.93 pounds of "TYLAC" 97422 styrene butadiene copolymer latex, 5.0 pounds polyethylene wax emulsion having a 30 weight percent solids, 1.5 pounds "SANDUVOR" 3225 oxazoline/chlorobenzotriazole, 4.0 pounds of an antioxidant having a 60 weight percent essential ingredient content, 0.02 pounds "TEKTAMER" 38 A.D. DBDCB, 0.55 pounds "UCAR POLYPHOBE" 107 acrylic latex, and 2.0 pounds deionized water. The "UCAR POLYPHOBE" was added more slowly than the rest of the ingredients to avoid lump formation in the coating composition. Once all of the ingredients were added to the tank, the mixing was continued for another 10–15 minutes to assure a homogeneous mixture. Thereafter, the pH and viscosity of the mixture were determined to be satisfactory.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An automotive surface peelable coating composition for protecting the automotive surfaces from the outside elements, the peelable coating composition comprising:
    a latex of rubber particles selected from the group consisting of butadiene homopolymers and copolymer, styrene butadiene copolymer, and vinyl acetate ethylene copolymer, wherein said latex is employed in the resultant coating composition in amounts of between about 35 and about 50 weight percent;
    a UV absorber employed in an amount of from about 0.25 to about 1.0 weight percent of the composition;
    from about 0.07 to about 0.40 weight percent of a thixotropic agent to prevent run off of the composition once coated;
    a defoaming agent employed in an amount of from about 0.03 to 0.08 weight percent of defoamer essential ingredient; and
    the balance being water.

2. The coating composition according to claim 1, further comprising a stabilizer selected from the group consisting of antioxidants, rust inhibitors and pH stabilizers.

3. The coating composition according to claim 1, further comprising an additive selected from the group consisting of a wax, a biocide and a levelling agent.

4. The coating composition according to claim 1, wherein the UV absorber is employed in an amount of from about 0.25 to about 1 weight percent and the coating composition further comprises:
    from about 0.5 to about 4 weight percent of an antioxidant; and
    from about 0.003 to about 0.03 weight percent of a biocide.

5. The coating composition according to claim 1, further comprising:
    from about 0.5 to about 4 weight percent of a wax;
    from about 0.1 to about 3 weight percent of a levelling agent; and
    from about 0.1 to about 0.5 weight percent of a pH stabilizer, wherein all weight percents are based on the total weight of the coating composition.

6. A coating composition which forms a peelable coating for protecting surfaces of an object from the outside elements, the coating composition comprising:
    a latex of styrene butadiene copolymer rubber particles, wherein the rubber particles are present from about 35 to about 50 weight percent in the coating composition;
    from about 0.25 to about 1 weight percent of a UV absorber;
    from about 0.5 to about 4 weight percent of an antioxidant;
    from about 0.003 to about 0.03 weight percent of a biocide;
    from about 0.07 to about 0.40 weight percent of a thixotropic agent, wherein all weight percents are based on the total weight of the coating composition, the coating composition forming a coating which is peelable from a painted surface; and
    the balance being water.

7. A method of protecting a surface of an object from the outside elements, the method comprising:
    coating the surface with a layer of a coating composition which includes a latex of rubber particles and a UV absorber, wherein the rubber particles are present from about 35 to about 50 weight percent in the coating composition; and
    allowing the layer of coating composition to dry and form a coating which is capable of being peeled from the object.

8. The method according to claim 7, wherein the layer of the coating composition is coated to a thickness which results in the dried coating having a thickness of from about 8 to about 15 mils.

9. The method according to claim 7, wherein the rubber particles are formed of a polymer selected from the group consisting of butadiene homopolymers and copolymers and vinyl acetate ethylene copolymer.

10. The method according to claim 7, wherein the rubber particles are formed of styrene butadiene copolymer.

11. The method according to claim 7, further comprising a stabilizer selected from the group consisting of antioxidants and pH stabilizers.

12. The method according to claim 7, further comprising an dditive selected from the group consisting of a wax, a biocide, a defoamer, a thixotropic agent, and a levelling agent.

13. The method according to claim 7, wherein the UV absorber is employed in the coating composition in an amount of from about 0.25 to about 1 weight percent, and the coating composition further comprises:

from about 0.5 to about 4 weight percent of an antioxidant;

from about 0.003 to about 0.03 weight percent of a biocide; and from about 0.07 to about 0.40 weight percent of a thixotropic agent, wherein all weight percents are based on the total weight of the coating composition.

14. The method according to claim 7, further comprising:

from about 0.03 to about 0.08 weight percent of a defoamer;

from about 0.5 to about 4 weight percent of a wax;

from about 0.1 to about 3 weight percent of a levelling agent; and from about 0.1 to about 0.5 weight percent of a pH stabilizer, wherein all weight percents are based on the total weight of the coating composition.

15. A method of protecting a surface of an object from the outside elements, the method comprising:

coating the painted surface with a layer of a coating composition to a thickness which results in the dried coating having a thickness of from about 8 to about 15 mils, the coating composition including a latex of styrene butadiene copolymer rubber particles, wherein the rubber particles are present from about 35 to about 50 weight percent;

from about 0.25 to about 1 weight percent of a UV absorber;

from about 0.5 to about 4 weight percent of an antioxidant;

from about 0.003 to about 0.03 weight percent of a biocide; and from about 0.07 to about 0.40 weight percent of a thixotropic agent, all weight percents being based on the total weight of the coating composition; and allowing the layer of coating composition to dry and form a coating which is capable of being peeled from the object.

* * * * *